United States Patent Office 3,161,611
Patented Dec. 15, 1964

3,161,611
AQUEOUS SOLUTIONS OF HYDROXYPROPYL SILANOLS AND THEIR PREPARATION
Gerd Rossmy, Altendorf (Ruhr), Germany, assignor to TH. Goldschmidt A.G. Chemische Fabriken, Essen, Germany, a corporation of Germany
No Drawing. Filed June 27, 1961, Ser. No. 119,809
Claims priority, application Germany, July 6, 1960, G 29,995
8 Claims. (Cl. 260—29.2)

This invention relates generally to organosilicon compounds and is particularly concerned with silanols, siloxanols and siloxanes and processes for their preparation.

In my copending U.S. patent application Serial No. 35,140, now U.S. Patent No. 3,109,012, issued October 29, 1963, I have disclosed processes for the preparation of sulfuric acid esters of organosilicon compounds and salts thereof.

The novel compounds of this copending application may be empirically defined by the formula $$R_aSi(OR'')_b(MOSO_3HA)_{4-(a+b+2c)}O_c$$

wherein R represents a monovalent hydrocarbon radical selected from the group consisting of alkyl, aryl, aralkyl, alkaryl and combinations of such radicals; M represents a divalent hydrocarbon radicals, the terminal groups of said divalent hydrocarbon radical being separated by at least one additional carbon atom; R'' represents a member selected from the group consisting of R-radicals as defined above and hydrogen, and A represents a member selected from the group consisting of amine and ammonia; $a$, $b$, and $c$ are numbers defined by:

$$a=0-3$$
$$b=0-3$$
$$c=0-1.5$$
$$1 \leq (a+b+2c) \leq 4$$

In this copending application I have distinguished between two basically different procedures for arriving at the desired compounds, to wit:

(1) Siloxanes of the general Formula A

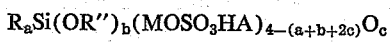
$$[R_{n'}Si(MOCOR)_mO_{2\frac{1}{2}(n+m)}]_r$$

are reacted with sulfuric acid or sulfuric acid derivatives, whereby siloxanes are obtained which comprise

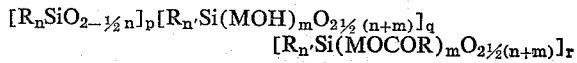

groups.

In this Formula A the various symbols have the following meaning:

Each of the R's stands for alkyl or aryl (which may be halogen-substituted) or hydrogen; each of the M's stands for a divalent hydrocarbon radical (which may be halogen-substituted) whose terminal groups are separated by at least one additional carbon atom, such as for example $C_3H_6$, $C_3H_5Cl$ or $C_4H_8$; and $n$, $n'$ and $m$ are numbers defined by:

$$n,n'=0-3$$
$$m=1-2, \text{ and}$$
$$1 \leq (n+m) \leq 3$$

The values within the various bracketed moieties may vary while $p$, $q$ and $r$ are numbers of any desired values. The ratio $q:r$ may be increased by saponification or by an alkaline catalyzed re-esterification carried out after hydrolysis until in some instances all the ester groups have disappeared.

(2) Monomeric halo- or alkoxy-silanes or mixtures of such compounds of the general Formula B $$R_xY_ySi(MOCOR)_{4-(x+y)}$$

are reacted with sulfuric acid or chlorosulfonic acid, whereby likewise silicon compounds having the aforementioned structural moieties are formed.

In Formula B, R and M have the same meaning as in Formula A; Y is halogen or alkoxy; $x$ and $y$ are numbers defined by:

$$x=0-3$$
$$y=0-3, \text{ and}$$
$$1 \leq (x+y) \leq 3$$

To summarize, it may be stated that the organo-silicon compounds used as starting compounds for preparing the sulfuric acid ester compounds of my copending application correspond empirically to the following formula

wherein R represents a monovalent hydrocarbon radicals selected from the group consisting of alkyl, aryl, aralkyl, alkaryl and combinations of such radicals; Y represents a member selected from the group consisting of halogen atoms and alkoxy radicals; M represents a divalent hydrocarbon radical, the terminal groups of said divalent hydrocarbon radical being separated by at least one additional carbon atom; R' represents a member selected from the group consisting of

radicals wherein R has the same meaning as defined above, hydrogen and mixtures thereof; $x$, $y$, $z$ are numbers having values as defined by:

$$x=0-3$$
$$y=0-3$$
$$z=0-1.5, \text{ and}$$
$$1 \leq (x+y+2z) < 4$$

These starting compounds are reacted with a sulfating agent which may be sulfuric acid, $SO_3$, amidosulfonic acid or chlorosulfonic acid.

A particularly advantageous embodiment of the process of my copending application resides in the reaction of chlorosulfonic acid with halosilanes corresponding to Formula B. In the event that, for example $y \geq 4-(x+y)$, the reaction products obtained may then be empirically defined by the general formula

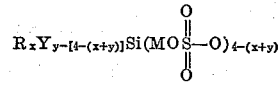

wherein the various symbols have the above meaning.

The copending application referred to discloses and teaches in what manner these reaction products may be developed and modified to form further variations by incorporation into the siloxane skeleton of conventional siloxanes.

Thus such incorporation may be accomplished by equilibration with siloxanes whose molecular size is limited by halo- or alkoxy-groups, which, in addition, comprise sulfate groups and which correspond to the formula $$R_aSiO_b(SO_4)_cX_{4-(a+2b+2c)}$$

wherein R has the above meaning, X is halogen or alkoxy and $a$, $b$ and $c$ are numbers defined by $$a=0-2.2$$
$$b=0.75,$$
$$c=0-0.5, \text{ and}$$
$$2.5 < (a+2b+2c) < 4$$

The compounds obtained according to procedures (1)

and (2) elucidated above—which compounds, as set forth, may have been modified or varied by equilibration with other siloxanes—may subsequently be further processed by hydrolysis and/or alcoholysis, whereby under certain circumstances the acid sulfate ester group is neutralized.

Although I have empirically designated the compounds of my copending application 35,140 by the formula

as mentioned above, it will be realized that this formula may be broadened and that the compounds under consideration are correctly reflected and embraced by the following Formula N:

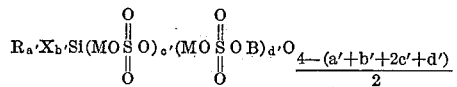

wherein R represents a monovalent hydrocarbon radical selected from the group consisting of alkyl, aryl, aralkyl, alkaryl, combinations of such radicals and hydrogen; X stands for halogen, OR, ½SO₄ and mixtures thereof; M is a divalent hydrocarbon radical the terminal groups thereof being separated by at least one additional carbon atom; B stands for hydrogen, NR₄ or the equivalent of a metal, as for example Na, K, ½Ca, ⅓Al, ¼Zr and mixtures thereof and $a'$, $b'$, $c'$ and $d'$ are numbers defined by:

$$a', b' = 0\text{-}3$$
$$c' = 0\text{-}1.5$$
$$d' = 0\text{-}3$$
$$(a' + b' + 2c' + d') = 2\text{-}4$$
$$c' + d' = 0.01\text{-}3$$

A chemist skilled in this particular branch of chemistry will, of course, readily appreciate that this formula may embrace substances which conceivably contain a few groups whose nature and characteristics are presently unknown and which are formed by side reactions during the sulfatization.

It is a primary object of my invention to produce novel organosilicon alcohols and their condensation products with silanols, respectively, from the compounds of Formula N.

Another object of my invention is to provide a novel process for the preparation of organosilicon alcohols and their condensation products with silanols from compounds embraced by the general Formula N.

A further object of this invention is the production of organosilicon compounds suitable for the impregnation of paper, textile materials, leather and other materials.

It is also an object of my invention generally to improve on the art of organosilicon compounds and processes for their preparation.

Briefly, and in accordance with my invention, I have ascertained that compounds corresponding to Formula N given above lend themselves to and are most suitable for the preparation of organosilicon alcohols $$(\equiv Si\text{---}MOH)$$

and their condensation products with silanols $$(\equiv Si\text{---}M\text{---}O\text{---}Si\equiv)$$

by simple acid or alkaline saponification.

The novel compounds obtained by the saponification of the compounds (N) may empirically be defined by the general Formula M

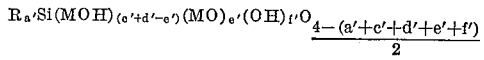

wherein R stands for alkyl, aryl, alkaryl, aralkyl, hydrogen or mixtures thereof; M is a divalent hydrocarbon radical whose terminal groups are separated by at least one additional carbon atom, and mixtures thereof, and $a'$ $b'$, $c'$, $d'$, $e'$ and $f'$ are numbers defined by:

$$a', b' = 0\text{-}3$$
$$c' = 0\text{-}1.5$$
$$d' = 0\text{-}3$$
$$e' = 0\text{-}1$$
$$f' = 0\text{-}3$$
$$(a' + c' + d' + e' + f') = 2\text{-}4$$
$$c' + d' = 0.01\text{-}3$$

The chemist skilled in this partciular branch of chemistry will readily realize that this Formula M may embrace substances which may contain a few groups X and

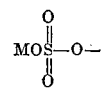

emanating from the starting material and which were not hydrolyzed and saponified.

As previously set forth, the preparation of the novel compounds is accomplished in exceedingly simple manner by way of acid or alkaline saponification of the sulfate ester. The saponification procedure is carried out in the usual manner. I have found, however, that the pH value in the solutions to be saponified should preferably be smaller than 2 or greater than 12. The aqueous solutions to be saponified are subjected to elevated temperatures for a prolonged period of time and are preferably heated to a boiling point.

The inventive process has many advantages. A particular advantage to be stressed resides in the preparation of the novel compounds directly from aqueous solutions. In doing so, the reaction caused by the saponification proceeds smoothly, readily and quantitatively and, to start with, in a homogeneous phase. This, of course, results in the very important expedient that the siloxanes can be shipped or transported to the place of use in water, i.e., in a solvent which is not only inexpensive but which, for many purposes, is indispensable. The siloxanes are then precipitated at the desired location. In the event that the proportion of the organo-functional

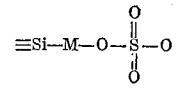

groups amounts to at least 30 mole present of all Si atoms present, it is possible to control and direct the saponification in such a manner that clear, aqueous solutions of silanols or siloxanols containing $\equiv Si\text{---}M\text{---}OH$ groups are obtained. The saponification may be thus controlled by suitably choosing the concentration conditions. The respective permissible concentration of Si-compounds, acids or alkali during the saponification which will still yield clear, aqueous solutions, is entirely dependent on the structure and composition of the Si-compounds. Thus, the concentration may be the higher the larger the proportion of organo-functional sulfate ester groups in the Si-compound. Generally, however, the concentration of the organosilicon compounds in the aqueous phase should not exceed 10%.

For illustration purposes, it may be mentioned that γ-acetoxypropylmethyldichlorosilane, upon reaction with chlorosulfonic acid, yields a viscous liquid which has basically the following polymer formula:

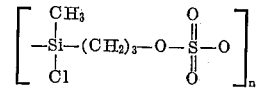

wherein $n$ is any whole number. If a 3% solution of this substance in water is prepared and this solution is boiled for several hours, a clear solution is obtained.

which comprises sulfuric acid, hydrochloric acid and the silanol:

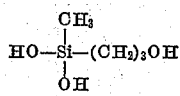

and corresponding siloxanols, respectively, which have been formed thereof by condensation.

The stability in boiling, acid solutions clearly indicates that the silanol:

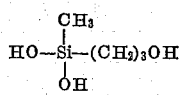

is in equilibrium with a small amount of high molecular, still water soluble condensation products. The presence of the silanol referred to can be determined by cryoscopic molecular weight determinations. In similar manner, aqueous solutions of the silanol $(HO)_3Si(CH_2)_3OH$ are obtained.

The acids may be separated from these aqueous solutions by known methods. Thus, for example, the sulfuric acid can be precipitated by adding barium hydroxide, while hydrochloric acid may be removed by reaction with silver oxide. Particularly simple and economic is the removal of all the acids by means of anion exchangers in the hydroxyl form. Of course, it is feasible to effect neutralization of the acids by combining the use of ion exchangers with precipitation methods. Thus, for example, the sulfuric acid may first be precipitated with barium hydroxide whereafter the neutralization of the remaining acid is accomplished by means of ion exchangers.

In this manner, neutral solutions of organo-silicon alcohols are obtained which, upon concentration, yield polymeric, oily or even resin-like residues. Thus, for example, the previously mentioned neutralized solution yields a resin-like product which may structurally be indicated in fully condensed condition by the formula:

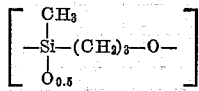

wherein $n$ is any whole number. This formula, of course, merely designates the extreme end condition of the condensation which only rarely is obtained or even desired. Intermediary stages wherein OH groups and $(CH_2)_3OH$ groups remain bonded to the Si-atom usually constitute the final product of the condensation for practical purposes. Such intermediary stage may, for example, be exemplified by the following formula which has been arbitrarily chosen for this purpose:

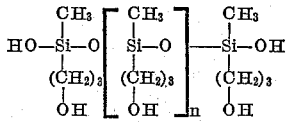

wherein $n$ is any whole number.

The condensation takes place upon mere heating to 50 to 150° C. Of course, if desired, the condensation may be accelerated by the addition of known condensation catalysts.

If the reaction product of chlorosulfonic acid and γ-acetoxypropyldimethylchlorosilane is saponified, aqueous solutions are obtained after the saponification and separation of the acids, which upon concentration leave oil-like residues which, in fully condensed condition, may be designated by the formula:

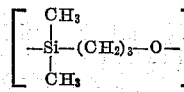

wherein $n$ is any whole number.

It is thus evident that organosilicon products of any desired consistency may be separated from the aqueous solutions by combining di-, tri- and also tetrafunctional siloxane units which, in addition to

structures (wherein $v=1-2$ and $w$ is any desired value) may also contain conventional siloxane moieties

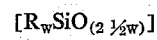

In addition to the great advantage that the novel compounds may be obtained and applied directly from aqueous solutions, such siloxanes have other peculiarities due to the presence of the reactive ≡Si—M—OH— or

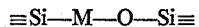

groups. Thus, they are reactive with other organic resins which may be due to the fact that the ≡Si—M—OH groups bring about the bonding to polar groups of such resins via hydrogen bridges, or which may be the result of a cleavage of the ≡Si—M—O—Si≡ grouping by the reaction with groups containing reactive hydrogen (for example $NH_2$, OH, or COOH) while at the same time new bonds are formed which are capable of linking siloxanes and organic resins. This may be illustrated for example by the following equation:

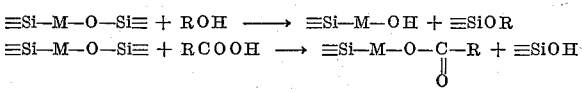

The aqueous silanol-solutions referred to have many uses. They may, for example be used for the emulsification of silicone oils. Upon concentration of the emulsions on goods to be impregnated, no surface active substances remain on the goods which is of particular advantage. This is due to the condensation procedure.

The organosilicon compounds produced in accordance with this invention are thus particularly suitable for the impregnation of paper, textiles, leather and other materials.

The invention will now be described in connection with the following examples, it being understood, however, that these examples are given by way of illustration and not by way of limitation, and that many changes in choice of starting compounds and process conditions in general may be effected without departing in any way from the scope and spirit of this invention as recited in the appended claims.

*Example 1*

616 parts by weight of distilled chlorosulfonic acid were slowly added within five hours to 1,137 parts by weight of γ-acetoxypropylmethyldichlorosilane. The addition was effected at a temperature of 55° C. at 20 mm. Hg. A residue was obtained which consisted of 1,126 parts by weight of a viscous liquid. 247 parts by weight of this viscous liquid were dissolved in 8,000 parts by weight of water. This resulted in a clear solution which was heated under reflux for 32 hours. After this period, the siliconorganic sulfate ester was completely, i.e. 100%, saponified, a fact which was controlled and determined by titration. The solution was thereafter stirred with an amount of anion exchanger in OH form sufficient to cause neutral reaction of the solution. After separation and washing of the ion exchanger, 8,200 parts by weight of a neutral solution were obtained. Upon concentration of this solution, 114 parts by weight of a lacquer-like silicon residue were obtained. This silicon resin solution could be concentrated in vacuo to a solid matter content of approximately 5% without there occurring any turbidity. Concentration to a 20% solid matter content likewise resulted in clear solutions which, however, became turbid upon several hours of standing and separated oil-like siloxanes.

Example 2

γ-Acetoxypropylmethyldichlorosilane was reacted with chlorosulfonic acid, by conditions according to Example 1. This reaction yielded a viscous oil having approximately the following composition:

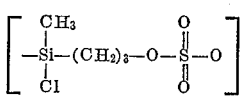

255 parts by weight of this substance were dissolved in 7,275 parts by weight of water. The sulfate ester could be completely saponified in this solution by boiling for 32 hours. 1,800 parts by weight of the clear solution, while still hot, were admixed thereafter with 75.4 parts by weight of $Ba(OH)_2 8H_2O$. This resulted in the precipitation of 55.8 parts by weight of $BaSO_4$. The solution was thereafter filtered and was admixed with an amount of anion exchanger in the OH form sufficient so as to cause neutral reaction of the solution. The ion exchanger was then rapidly separated. Cryoscopic molecular weight determinations indicated that the solution contained predominately mono-molecular γ-hydroxypropylmethylsilanediol. 300 parts by weight of the neutral solution yielded, upon concentration, 4.55 parts by weight of a resin-like residue of the following composition:

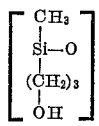

The percentage values of the various components are as follows:

|    | Actual, Percent | Theoretical, percent |
|----|---|---|
| Si | 23.0 | 23.8 |
| C  | 39.9 | 40.7 |
| H  | 8.5  | 8.5  |

The presence of the $Si(CH_2)_3$—OH structure could also be confirmed infrared spectroscopically by means of an absorption band at about 1,195 cm.$^{-1}$. The about 93% yield of resin may be increased by washing the ion exchanger, and adding the wash water to the solution.

Example 3

If the saponification of the sulfate ester oil of Example 2 is carried out in an aqueous solution of 30% concentration, an oil-like substance immediately precipitates from the originally clear solution upon boiling. This oil-like substance hardens upon drying to form a resin-like material having a composition corresponding to the concentration residue of Example 2. The yield is almost quantitative.

Example 4

The saponification described in Example 2 is carried out with an oil having the following approximate composition:

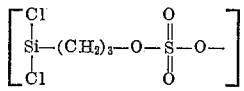

Cryoscopic determinations indicated that δ-hydroxypropylsilanetriol and its condensation products are present in the clear neutralized solution. The average composition corresponded to a condensation product with three Si atoms per molecule. 300 parts by weight of the neutral solution yielded upon concentration 4.43 parts by weight of a resin-like residue of the following composition:

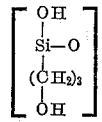

wherein the percentage values are as follows:

|    | Actual, Percent | Theoretical, percent |
|----|---|---|
| Si | 24.0 | 23.4 |
| C  | 28.9 | 30.0 |
| H  | 6.5  | 6.7  |

This corresponds to a yield of about 96%.

Example 5

11.2 parts by weight of a siloxane of the average composition:

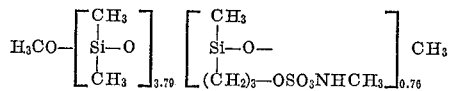

were dissolved in 150 parts by weight of water. The water had been adjusted to a pH value of 1 by addition of HCl. The solution was boiled whereby gel-like particles precipitated. These particles were separated after 100 hours and were washed and dried. 8.2 parts by weight of a product was obtained. Analysis indicated the following composition of the product:

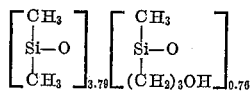

wherein the percentage values are as follows:

|    | Actual, Percent | Theoretical, percent |
|----|---|---|
| Si | 34.9 | (34.4) |
| C  | 33.9 | (34.4) |
| S  | 0.3  | (0) |

Example 6

1.7 parts by weight of a viscous oil of the approximate composition

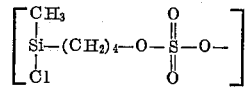

were dissolved in 170 parts by weight of water. Upon 72 hours of boiling of the solution the sulfate ester grouping $$(CH_2)_4-O-\overset{O}{\underset{O}{\overset{\|}{S}}}-O$$

had been completely saponified, as evidenced by titration of the acid. The clear solution was neutralized with an ion exchanger in the OH form. Cryoscopic determinations indicated that the neutralized solution predominantly contained δ-hydroxybutylmethylsilanediol.

Example 7

25 parts by weight of a product according to Example 2

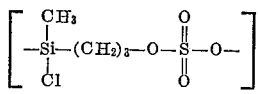

were dissolved in 250 parts by weight of water. 750 parts by weight of 1.33 n NaOH were added and the clear solution was heated under reflux for 6 hours. After this period the sulfate ester was completely saponified. An oil-like substance precipitated from the acidified solution when evaporating the main part of water, which hardened upon drying at a temperature of 100° C. to form a resin-like material. The infrared analysis showed that this substance was analogous to the residue of Example 2.

Example 8

From a mixture consisting of 339 parts by weight of the product according to Example 2

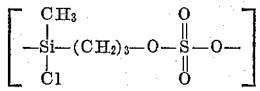

and 114 parts by weight of a siloxane of the formula

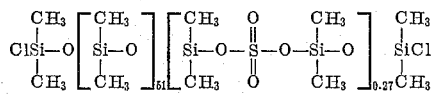

a product was obtained by equilibration at a temperature of 100° C. having the following average composition $$Si[(CH_2)_3OSO_3]_{0.5}(CH_3)_{1.5}O_{0.49}Cl_{0.52}[SO_4]_{0.005}$$

A 1% solution of this substance in water was heated under reflux for 24 hours; after this period the sulfate ester groups were completely saponified. The solution was then neutralised with Ba(OH)$_2$ and ion exchanger, whereafter it showed a 0.6% resin-like residue upon evaporating the water, which contained according to the infrared analysis

and

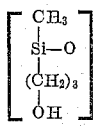

units.

What is claimed is:
1. An aqueous solution of the silanol of the formula

$$(HO)_3Si[(CH_2)_3OH]$$

where the silanol is in equilibrium with its condensation products in the aqueous solution, said silanol being present in larger amounts than said condensation products.

2. An aqueous solution of the silanol of the formula $$(HO)_2Si(CH_3)[(CH_2)_3OH]$$

wherein the silanol is in equilibrium with its condensation products in the aqueous solution, said silanol being present in larger amounts than said condensation products.

3. A process for the preparation of organosilicon compounds of the general Formula A:

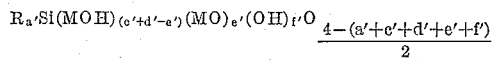

which comprises saponifying aqueous solutions of organosilicon compounds of the Formula B:

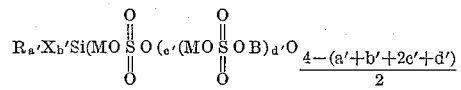

wherein the symbols in said Formulas A and B have the following meanings: R is a member selected from the group consisting of alkyl, aryl, alkaryl, aralkyl, hydrogen and mixtures thereof; X is selected from the group consisting of halogen, OR, ½SO$_4$ and combinations thereof; M is a divalent hydrocarbon radical whose terminal groups are separated by at least one additional carbon atom and combinations of such radicals; B is a member selected from the group consisting of hydrogen, NR$_4$, the equivalent of a metal and combinations thereof; and $a'$, $b'$, $c'$, $d'$, $e'$ and $f'$ are numbers defined by:

$a', b' = 0-3$
$c' = 0-1.5$
$d' = 0-3$
$e' = 0-1$
$f' = 0-3$
$(c'+d') = 0.01-3$
$(a'+b'+2c'+d') = 2-4$
$(a'+c'+d'+e'+f') = 2-4$

4. A process as claimed in claim 3, wherein said metal is selected from the group consisting of Na, K, ½Ca, ⅓Al and ¼Zr.

5. A process as claimed in claim 3, wherein R is CH$_3$ and M is (CH$_2$)$_3$.

6. A process as claimed in claim 3, where in the sponification is carried out at a pH value of less than 2 and at temperatures above 50° C.

7. A process as claimed in claim 3, wherein the sponification is carried out with a pH value greater than 12 and at temperatures above 50° C.

8. A process as claimed in claim 3, wherein the saponification is carried out at a pH value less than 2 and wherein the concentration of the compound to be saponified in the solution is less than 10%.

References Cited in the file of this patent

UNITED STATES PATENTS

| | | |
|---|---|---|
| 2,443,898 | Ellingboe | June 22, 1948 |
| 2,894,967 | Gilkey | July 14, 1959 |
| 2,924,588 | Speier | Feb. 9, 1960 |

FOREIGN PATENTS

| | | |
|---|---|---|
| 556,018 | Canada | Apr. 15, 1958 |

OTHER REFERENCES

Schmidt et al.: "Angewandte Chemie," vol. 70 (1958), pp. 469–70 and p. 657.